(12) United States Patent
Oh

(10) Patent No.: US 11,628,323 B2
(45) Date of Patent: Apr. 18, 2023

(54) SPRINKLER REDUCER FIXING BRACKET

(71) Applicant: KOFULSO CO., LTD., Incheon-si (KR)

(72) Inventor: Seung-Il Oh, Seoul (KR)

(73) Assignee: KOFULSO CO., LTD, Incheon-si (KR)

( * ) Notice: Subject to any disclaimer, the term of this patent is extended or adjusted under 35 U.S.C. 154(b) by 111 days.

(21) Appl. No.: 17/389,506

(22) Filed: Jul. 30, 2021

(65) Prior Publication Data

US 2022/0355145 A1 Nov. 10, 2022

(30) Foreign Application Priority Data

Apr. 22, 2021 (KR) .......................... 10-2021-0052433

(51) Int. Cl.
| | | |
|---|---|---|
| *A62C 35/68* | (2006.01) | |
| *A62C 31/28* | (2006.01) | |
| *F16L 3/10* | (2006.01) | |

(52) U.S. Cl.
CPC .............. *A62C 35/68* (2013.01); *A62C 31/28* (2013.01); *F16L 3/10* (2013.01)

(58) Field of Classification Search
CPC ............. A62C 35/68; A62C 31/28; F16L 3/10
See application file for complete search history.

(56) References Cited

U.S. PATENT DOCUMENTS

| | | |
|---|---|---|
| 2,375,513 A | 5/1945 | Bach |
| 3,341,909 A | 9/1967 | Havener |
| 3,556,452 A | 1/1971 | Ramsey |
| 3,558,091 A | 1/1971 | Bush |
| 3,608,857 A | 9/1971 | Hibbeler |
| 3,612,461 A | 10/1971 | Brown |
| 3,652,780 A | 3/1972 | Wilson |
| 3,874,035 A | 4/1975 | Schuplin |
| 4,135,692 A | 1/1979 | Ferguson |
| 4,149,693 A | 4/1979 | LoNigro |
| 4,408,428 A | 10/1983 | Brooke et al. |
| 4,544,119 A | 10/1985 | Kellett et al. |
| 4,717,099 A | 1/1988 | Hubbard |
| 4,723,749 A | 2/1988 | Carraro et al. |
| 5,024,404 A * | 6/1991 | Ballard .................. A62C 35/68 248/62 |
| 5,595,363 A | 1/1997 | DeLeebeeck |
| 5,667,181 A | 9/1997 | van Leeuwen et al. |
| 6,260,810 B1 | 7/2001 | Choi |
| 6,341,466 B1 | 1/2002 | Kehoe et al. |
| 6,345,800 B1 | 2/2002 | Herst et al. |
| 6,554,231 B2 | 4/2003 | Choi |

(Continued)

*Primary Examiner* — Anita M King
(74) *Attorney, Agent, or Firm* — Jacobson Holman PLLC

(57) ABSTRACT

A sprinkler reducer fixing bracket that is capable of allowing a reducer to be adjusted in height, especially in a state where the reducer is coupled thereto. The sprinkler reducer fixing bracket includes a body fitted to a horizontal bar, a hook member whose one side is rotatably coupled to the body by means of a shaft member, a locking shaft disposed on the hook member and having a cam portion adapted to push the body to allow the hook member to move to a position for fixing the reducer up and down, and U-shaped first and second locking pins adapted to allow the hook member to maintain the fixed position of the reducer in the up and down directions.

4 Claims, 4 Drawing Sheets

(56) References Cited

U.S. PATENT DOCUMENTS

| | | |
|---|---|---|
| 6,811,130 B1 | 11/2004 | Oh |
| 7,032,690 B2 | 4/2006 | Ramey et al. |
| 7,255,315 B2 | 8/2007 | Oh |
| 8,413,734 B2 * | 4/2013 | Silcox .................... E04B 9/006 52/39 |
| 8,833,718 B2 | 9/2014 | Oh |
| 9,004,422 B2 | 4/2015 | Feenstra |
| 9,320,927 B2 * | 4/2016 | DeVaney ............... A62C 31/28 |
| 9,341,286 B1 | 5/2016 | Oh |

* cited by examiner

SPRINKLER REDUCER FIXING BRACKET

CROSS REFERENCE TO RELATED APPLICATION OF THE INVENTION

The present application claims the benefit of Korean Patent Application No. 10-2021-0052433 filed in the Korean Intellectual Property Office on Apr. 22, 2021, the entire contents of which are incorporated herein by reference.

BACKGROUND OF THE INVENTION

Field of the Invention

The present invention relates to a sprinkler reducer fixing bracket that is capable of allowing a reducer to be adjusted in height, especially in a state where the reducer is coupled thereto.

Background of the Related Art

Generally, a sprinkler reducer fixing bracket is a device for mounting a reducer onto a square pipe built on a ceiling. One side of the reducer is connected to a corrugated pipe, and the other side thereof is coupled to the head of a sprinkler.

A conventional sprinkler reducer fixing bracket, which is capable of allowing a reducer to be just pushed thereinto and to be thus conveniently mounted thereon, is disclosed in U.S. Pat. No. 9,341,286 issued to the same applicant as the invention.

According to the conventional sprinkler reducer fixing bracket, however, if the reducer is just pushed into the bracket, a hook is closed to cause the reducer to be fixed in position in up and down directions, thereby undesirably failing to adjust the reducer in height.

Accordingly, the inventor has made many endeavors to develop a sprinkler reducer fixing bracket capable of allowing a reducer to move in up and down directions and to be thus adjusted and fixed in height, in a state where the reducer is pushed into a body and an open portion is closed to make the reducer coupled to the body, and as a result, a sprinkler reducer fixing bracket according to the present invention as will be discussed below is provided.

SUMMARY OF THE INVENTION

Accordingly, the present invention has been made in view of the above-mentioned problems occurring in the related art, and it is an object of the present invention to provide a sprinkler reducer fixing bracket that is capable of allowing a reducer to be adjusted in height, especially in a state where the reducer is coupled thereto.

To accomplish the above-mentioned object, according to the present invention, there is provided a sprinkler reducer fixing bracket including: a body having an insertion space adapted to fit a horizontal bar thereto and a first mounting portion formed thereon; and a hook member having a second mounting portion corresponding to the first mounting portion and a shaft member adapted to allow one side thereof to be rotatably coupled to the body therearound, wherein the body includes: a long hole formed slantly on one side thereof in such a manner as to pass the shaft member therethrough; a first long locking hole formed on the other side thereof; and a U-shaped first locking pin fitted to the first long locking hole, and the hook member includes: a slant portion formed on the other side thereof in such a manner as to come into contact with one side of the first locking pin protruding from the first long locking hole; a locking groove formed adjacent to the slant portion in such a manner as to fit one side of the first locking pin thereto; a second long locking hole formed on the other side thereof; a releasing groove connected to the second long locking hole; a locking shaft disposed at the inside of the other side thereof and having a cam portion adapted to push the body and slant teeth slantly formed in one side direction; a driver groove formed on a head portion of the locking shaft; and a U-shaped second locking pin fitted to the second long locking hole in such a manner as to be locked onto the slant teeth.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Hereinafter, the present invention will be described in detail below with reference to the accompanying drawings.

Figure 1:
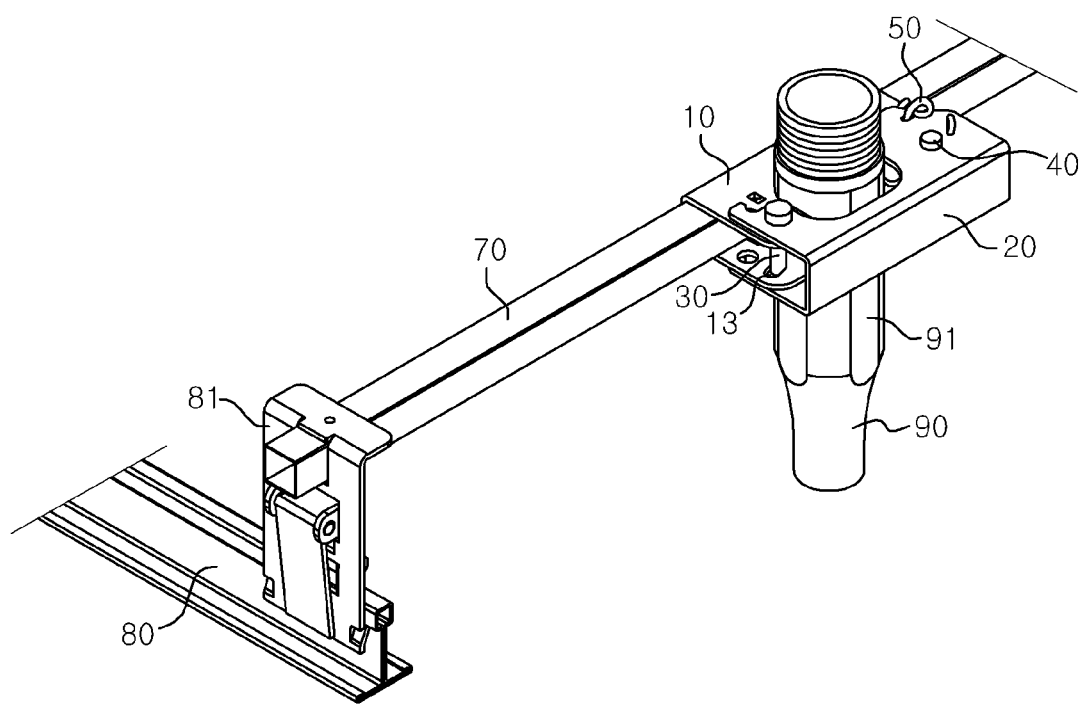
FIG. 1 is a perspective view showing a sprinkler reducer fixing bracket according to the present invention.

As shown in FIG. 1, a sprinkler reducer fixing bracket according to the present invention is configured to allow a horizontal bar 70 to be fitted thereto, and through support brackets 81, both sides of the horizontal bar 70 are mounted perpendicularly on a pair of support frames 80 located in parallel to each other to build various structures into a ceiling.

According to the present invention, further, a sprinkler reducer 90 is mounted to a given height onto the sprinkler reducer fixing bracket fitted to the middle portion of the horizontal bar 70.

Figure 2:
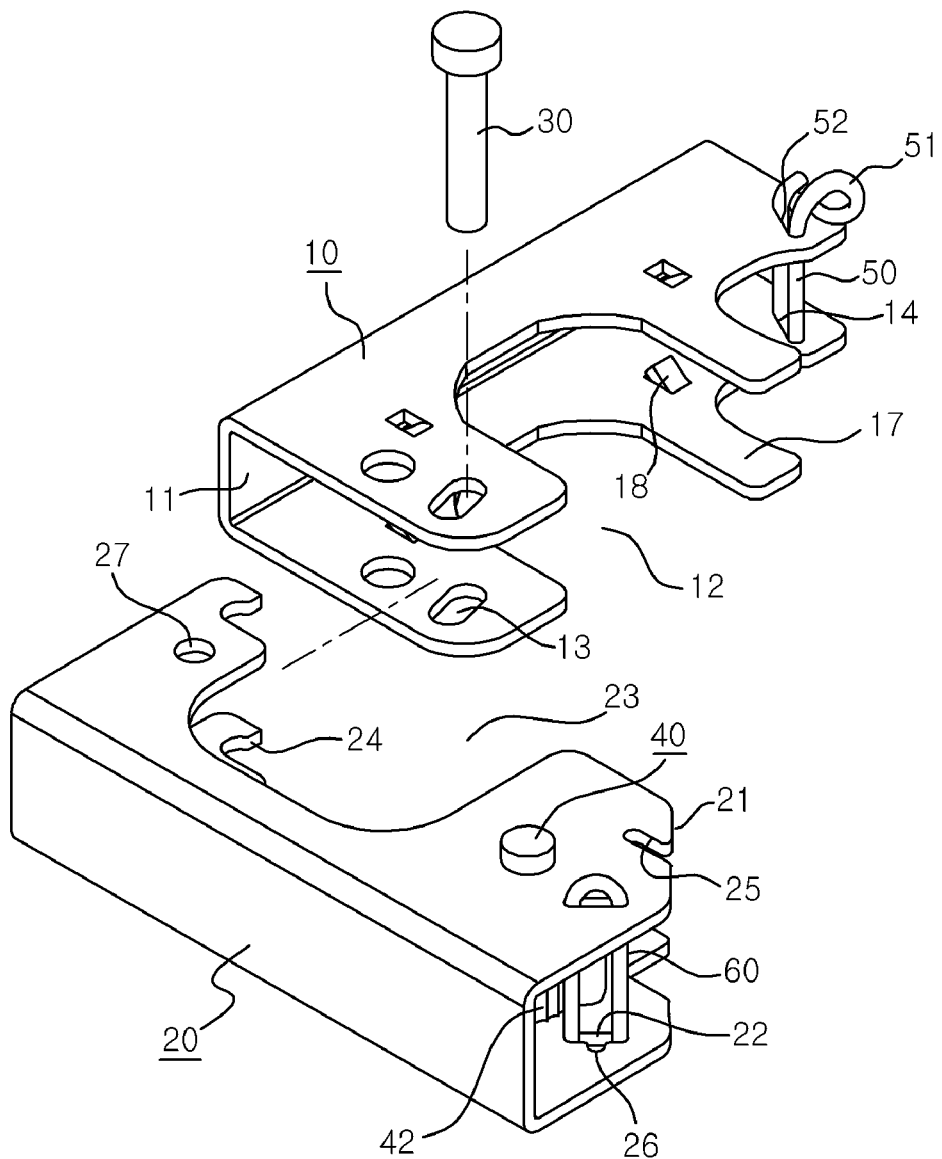
FIG. 2 is an exploded perspective view showing the sprinkler reducer fixing bracket according to the present invention.
Figure 3:
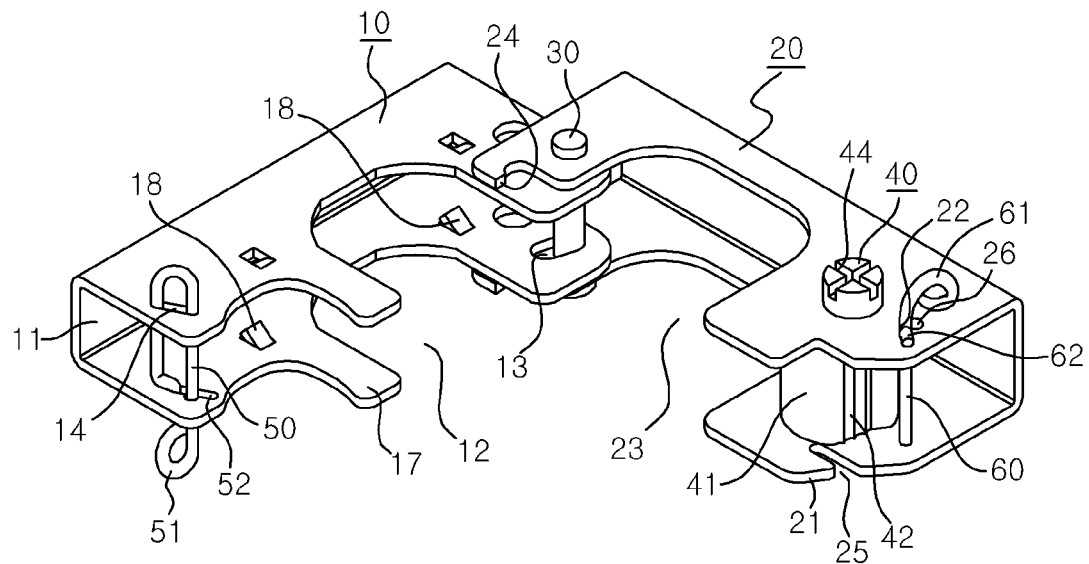
FIG. 3 is a bottom perspective view showing the sprinkler reducer fixing bracket according to the present invention.

As shown in FIGS. 2 and 3, the sprinkler reducer fixing bracket according to the present invention includes: a body 10 having an insertion space 11 adapted to fit the horizontal bar 70 thereto and a first mounting portion 12 formed thereon; and a hook member 20 having a second mounting portion 23 corresponding to the first mounting portion 12 and a shaft member 30 adapted to allow one side thereof to be rotatably coupled to the body 10 therearound. According to the present invention, the body 10 has a long hole 13 formed slantly on one side thereof in such a manner as to pass the shaft member 30 therethrough, a first long locking hole 14 formed on the other side thereof, and a U-shaped first locking pin 50 fitted to the first long locking hole 14, and the hook member 20 has a slant portion 21 formed on the other side thereof in such a manner as to come into contact with one side of the first locking pin 50 protruding from the first long locking hole 14, a locking groove 25 formed adjacent to the slant portion 21 in such a manner as to fit one side of the first locking pin 50 thereto, a second long locking hole 22 formed on the other side thereof, a releasing groove 26 connected to the second long locking hole 22, a locking shaft 40 disposed at the inside of the other side thereof and having a cam portion 41 adapted to push the body 10 and slant teeth 42 slantly formed in one side direction, a driver groove 44 formed on a head portion of the locking shaft 40, and a U-shaped second locking pin 60 fitted to the second long locking hole 22 in such a manner as to be locked onto the slant teeth 42.

According to the present invention, that is, the sprinkler reducer fixing bracket includes the body 10 fitted to the horizontal bar 70, the hook member 20 whose one side is rotatably coupled to the body 10 by means of the shaft member 30, the locking shaft 40 disposed on the hook member 20 and having the cam portion 41 adapted to push the body 10 to allow the hook member 20 to move to a position for fixing the reducer 90 up and down, and the U-shaped first and second locking pins 50 and 60 adapted to allow the hook member 20 to maintain the fixed position of the reducer 90 in the up and down directions.

The body 10 has the insertion space 11 adapted to fit the horizontal bar 70 thereto and the first mounting portion 12 adapted to allow the reducer 90 to be erectedly coupled thereto, and the hook member 20 has the second mounting portion 23 corresponding to the first mounting portion 12. The hook member 20 is rotatably coupled to one side of the body 10 around a shaft hole 27 formed thereon by means of the shaft member 30 passing through the long hole 13 formed on one side of the body 10.

The body 10 and the hook member 20 are each made by bending a plate material to a shape of '⊏'. The height of the insertion space 11 corresponds to the height of the horizontal bar 70, and the top and underside of the body 10 are inserted into the hook member 20. The width of the first mounting portion 12 corresponds to the width between facing plane portions 91 of the reducer 90.

The cam portion 41 serves to push a leg portion 17 of the body 10 at the inside of the hook member 20, and if the cam portion 41 pushes the leg portion 17, the hook member 20 is guided along the long hole 13 and the locking groove 25 by means of the shaft member 30 to allow the reducer 90 to be compressedly fitted to the horizontal bar 70 through the second mounting portion 23. In this case, the other side of the first locking pin 50 is inserted into the locking groove 25.

The body 10 has support protrusions 18 protruding inwardly from top and underside thereof at positions corresponding to the width of the horizontal bar 70, and the horizontal bar 70 fitted to the insertion space 11 is exposed partially to the first mounting portion 12, so that the compressing force applied from the second mounting portion 23 is transferred to the horizontal bar 70.

The hook member 20 has a protruding portion 24 formed on one side thereof in such a manner as to be located at the inside of the first mounting portion 12 when the hook member 20 is open, and when the reducer 90 is pushed into the first mounting portion 12, accordingly, the hook member 20 is closed.

The first locking pin 50 and the second locking pin 60 have bent ends 52 and 62 formed on one side thereof in such a manner as to be supported against one side of the first long locking hole 14 and the second long locking hole 22 and loop portions 51 and 61 formed on the other side thereof, respectively, so that if it is desired to separate the reducer 90 from the bracket, the loop portions 51 and 61 are pushed by a user's hand to release the lock state.

So as to mount the reducer 90 onto the sprinkler reducer fixing bracket according to the present invention, like this, the horizontal bar 70 disposed on the ceiling is fitted to the insertion space 11 of the body 10. The support protrusions 18 serve to restrict the horizontal bar 70 in position, and a portion of the horizontal bar 70 protrudes from the first mounting portion 12.

Figure 4:
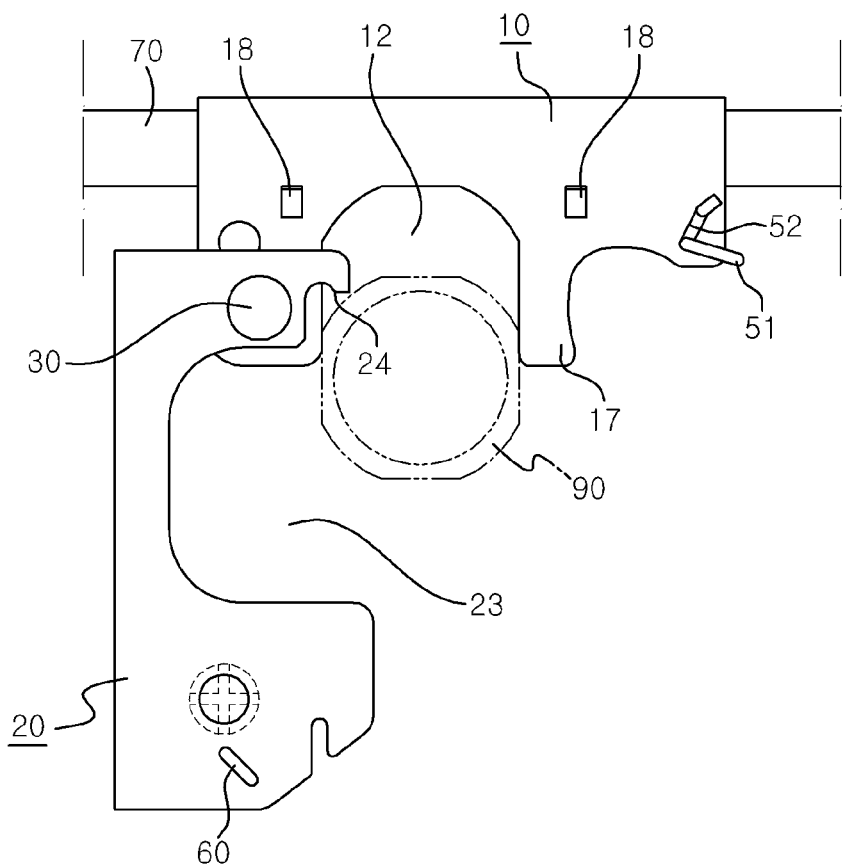
FIG. 4 is a plan view showing a state where a hook member is open in the sprinkler reducer fixing bracket according to the present invention.

As shown in FIG. 4, the hook member 20 is open to allow the protruding portion 24 to be located in the first mounting portion 12.

In this state, the reducer 90 pushes the protruding portion 24, and in a state where the hook member 20 is fitted to the first mounting portion 12 in such a manner as to rotate somewhat around the shaft hole 27, if the hook member 20 is closed with respect to the body 10, the first locking pin 50 is guided by the slant portion 21 and is thus located at the inlet of the locking groove 25, while the shaft member 30 is being located at one side of the long hole 13.

Figure 5:
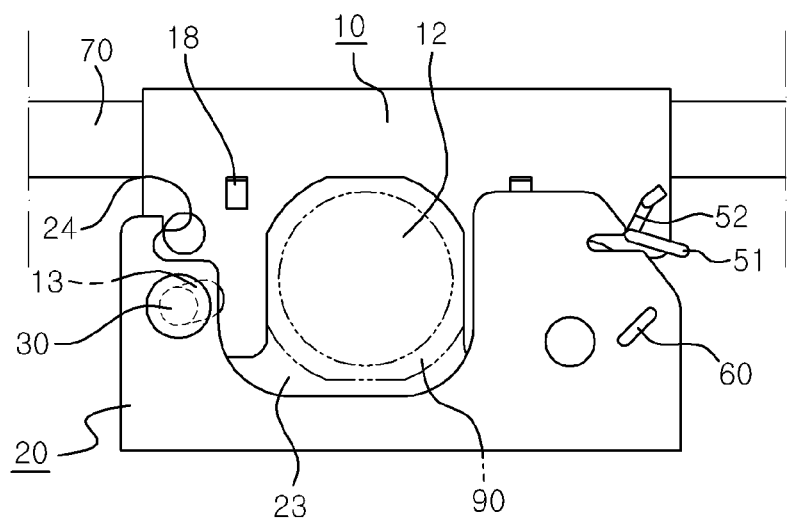
FIG. 5 is a plan view showing a state where the hook member is closed in the sprinkler reducer fixing bracket according to the present invention.

As shown in FIG. 5, that is, the reducer 90 does not move in front, back, left and right directions by means of the first mounting portion 12 and the second mounting portion 23, but the reducer 90 can move freely in up and down directions.

Figure 6:
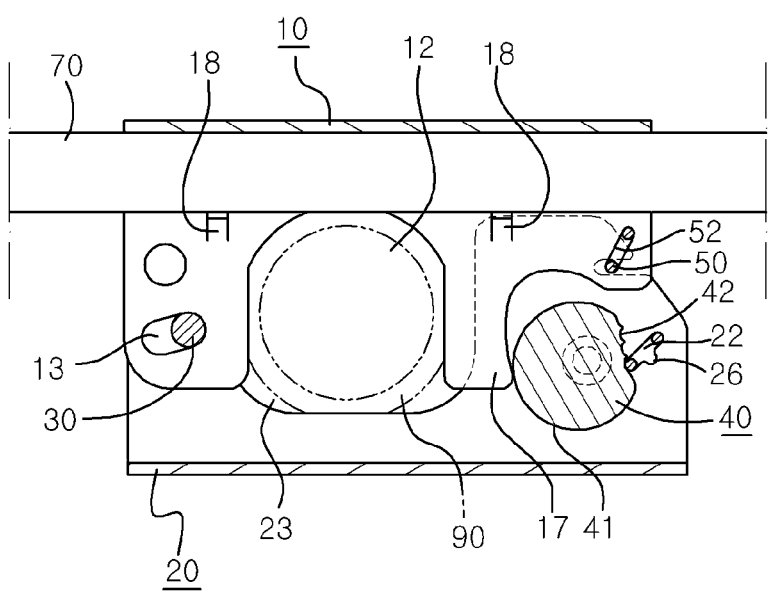
FIG. 6 is a side view showing a state where a shaft member rotates to allow the hook member to fit a reducer thereto by means of a cam portion in the sprinkler reducer fixing bracket according to the present invention.

In this case, the height of the reducer 90 is adjusted, and if the locking shaft 40 rotates through the driver groove 44, the cam portion 41 pushes the leg portion 17 of the body 10. Accordingly, the shaft member 30 moves to the other side of the long hole 13, and the first locking pin 50 is inserted into the locking groove 25. As shown in FIG. 6, the hook member 20 moves to allow the reducer 90 to fittedly come into contact with the horizontal bar 70 through the second mounting portion 23, so that the reducer 90 adjusted in height can be also fixed to the horizontal bar 70 in the up and down directions. In this case, one side of the second locking pin 60 is locked onto the slant teeth 42 so that the locking shaft 40 can rotate by means of an elastic force in a locking direction but cannot rotate in the opposite direction to the locking direction.

If it is desired to separate the reducer 90 fitted to the bracket from the bracket, the loop portion 61 is pushed to allow the second locking pin 60 to be fitted to the releasing groove 26, and accordingly, the second locking pin 60 escapes from the slant teeth 42. If the locking shaft 40 rotates in the opposite direction to push the hook member 20, in this case, the shaft member 30 and the first locking pin 50 are returned to their original position, and the second mounting portion 23 becomes distant from the reducer 90, thereby making a state where the reducer 90 is separable.

The first locking pin 50 is pushed upward from the second long locking hole 22 through the loop portion 51, and next, if the hook member 20 rotates around the shaft member 30 and is open with respect to the body 10, the reducer 90 can be separated simply from the bracket according to the present invention.

As described above, like this, the sprinkler reducer fixing bracket according to the present invention is configured to allow the reducer 90 to be pushed into the first mounting portion 12 in a state where the hook member 20 is open, and if the hook member 20 rotates, to allow the second mounting portion 23 to close the first mounting portion 12, so that the reducer 90 can be primarily coupled thereto. According to the present invention, in this state, if the locking shaft 40 rotates by means of a driver, the cam portion 41 pushes the body 10 to allow the hook member 20 to move along the long hole 13 and the locking groove 25, so that the reducer 90 can be fixed thereto by means of the second mounting portion 23, without any movement even in the up and down directions. In the state where the reducer 90 has been primarily coupled to the bracket, accordingly, the reducer 90 can be adjusted in height and then fixed to the bracket, thereby efficiently performing the installation work of the reducer 90 on the horizontal bar 70.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A sprinkler reducer fixing bracket comprising:
a body having an insertion space adapted to fit a horizontal bar thereto and a first mounting portion formed thereon; and
a hook member having a second mounting portion corresponding to the first mounting portion and a shaft member adapted to allow one side thereof to be rotatably coupled to the body therearound,
wherein the body comprises: a long hole formed slantly on one side thereof in such a manner as to pass the shaft member therethrough; a first long locking hole formed on the other side thereof; and a U-shaped first locking pin fitted to the first long locking hole, and the hook member comprises: a slant portion formed on the other side thereof in such a manner as to come into contact with one side of the first locking pin protruding from the first long locking hole; a locking groove formed adjacent to the slant portion in such a manner as to fit one side of the first locking pin thereto; a second long locking hole formed on the other side thereof; a releasing groove connected to the second long locking hole; a locking shaft disposed at the inside of the other side thereof and having a cam portion adapted to push the body and slant teeth slantly formed in one side direction; a driver groove formed on a head portion of the locking shaft; and a U-shaped second locking pin fitted to the second long locking hole in such a manner as to be locked onto the slant teeth.

2. The sprinkler reducer fixing bracket according to claim 1, wherein the body and the hook member are each made by bending a plate material to a shape of '⊏'.

3. The sprinkler reducer fixing bracket according to claim 1, wherein the body has support protrusions protruding inwardly from top and underside thereof at positions corresponding to the width of the horizontal bar.

4. The sprinkler reducer fixing bracket according to claim 1, wherein the first locking pin and the second locking pin each have a bent end formed on one side thereof in such a manner as to be supported against one side of the first long locking hole and the second long locking hole and a loop portion formed on the other side thereof.

* * * * *